TELEPHONE MONITORING OF REMOTELY LOCATED AREAS

Filed June 16, 1966

INVENTOR.

GUSTAV SCHAUM
RUDOLF KREMP
JOHANN BECKER
FRITZ HIEBER
HANS-PETER HUBER

Michael J. Striker, Atty.

TELEPHONE MONITORING OF REMOTELY LOCATED AREAS

Filed June 16, 1966 2 Sheets-Sheet 2

INVENTOR.
BY GUSTAV SCHAUM
RUDOLF KREMP
JOHANN BECKER
FRITZ HIEBER
HANS-PETER HUBER

United States Patent Office 3,530,250
Patented Sept. 22, 1970

3,530,250

TELEPHONE MONITORING OF REMOTELY LOCATED AREAS

Gustav Schaum, Leverkusen, Rudolf Kremp, Grunwald, near Munich, Johann Becker, Dinslaken, Fritz Hieber, Grunwald, near Munich, and Hans-Peter Huber, Munich, Germany, assignors to Agfa-Gevaert Aktiengesellschaft, Leverkusen, Germany Filed June 16, 1966, Ser. No. 558,037
Claims priority, application Germany, June 19, 1965, A 49,529; Apr. 6, 1966, A 52,093
Int. Cl. H04m *11/00*
U.S. Cl. 179—2 4 Claims

ABSTRACT OF THE DISCLOSURE

A telephone arrangement for monitoring acoustically remotely-located areas through the use of conventional instruments. A switching device, when set, will receive the ringing signals from a remotely-located telephone instrument, and after the elapse of a predetermined time interval, will connect a microphone to the line. The microphone will thereupon transmit over the telephone line any sounds impinging upon it. After the elapse of a second time interval, the switching device disconnects the microphone from the telephone line, and the monitoring cycle is terminated. When the switching device is set, the ringing signals are not transmitted to the bell of the telephone instrument, but are instead routed to circuitry within the switching device.

The present invention relates to an arrangement for monitoring acoustically remotely-located areas through adaptation of conventional telephones.

Devices for monitoring areas acoustically from a remote location are known in the art. In such devices a microphone is placed within the area to be monitored, and a loudspeaker operating in conjunction with the microphone, is located in the monitoring or observation area. However, these devices, heretofore, have been suitable only to applications wherein the microphone and th loudspeaker were located were located within the same house or the same general confinements. The devices were not applicable to situations in which the microphone and receiving loudspeaker were separated by relatively long distances of the order of miles. Arrangements for monitoring acoustically remotely-located areas are desirable because with their application, it is possible for a single observation station to monitor simultaneously a number of such areas.

Accordingly it is an object of the present invention to provide an arrangement whereby areas may be acoustically monitored through the application of conventional telephone apparatus.

Another object of the present invention is to provide an arrangement, as set forth, whereby the area to be acoustically monitored is associated with a specific telephone subscriber number.

Another object of the present invention is to provide a telephone arrangement, as set forth, whereby messages may be transmitted to the monitored area from the observation location.

Another object of the present invention is to provide a telephone arrangement, as set forth, suitable for monitoring children's areas and having features whereby the arrangement is secure from abusive callers.

Another object of the present invention is to provide an arrangement, as set forth, for acoustically monitoring automatic production processes.

A further object of the present invention is to provide an arrangement, as set forth, whereby several areas may be monitored simultaneously.

A still further object of the present invention is to provide an arrangement, as set forth, which can be readily manufactured as a separate and independent unit, and simply connected to conventional telephone communication systems.

With these objects in view, the invention includes a telephone receiving and transmitting apparatus, an electric transmission line connected to the telephone receiving and transmitting apparatus, a microphone adapted to be located remotely from the telephone receiving and transmitting apparatus, electrical connecting means coupling the microphone to the electric transmission line, and switching means arranged in the electrical connecting means for connecting and disconnecting the microphone from the transmission line whenever required.

The novel features which are considered as characteristic of the invention, are set forth in particular in the appended claims. The invention itself, however, both as to its construction and its method of operation together with additional objects and advantages thereof, will be best understood from the following description of specific embodiments when read in connection with the accompanying drawings in which:

Figure 1:
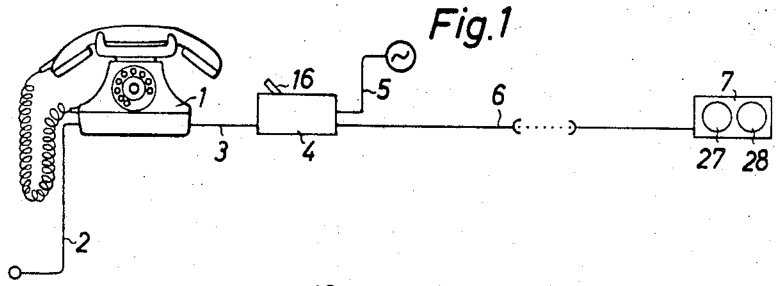
FIG. 1 is a functional schematic diagram, and shows the manner in which a conventional telephone is adapted to acoustically monitor remotely-located areas.

Referring to the drawing, a conventional telephone apparatus 1 is connected to a central switching station (not shown) by way of the path 2, for the purpose of receiving and transmitting telephone messages. A control unit 4 is connected electrically to the telephone through the path 3. The control unit 4 is also connected to a remotely-located microphone 27 mounted within a housing 7. A loudspeaker arrangement 28 may be included within the housing 7.

The control unit 4 is equipped with an "on-off" control switch 16 for actuating the unit and effecting the proper connections to the telephone and microphone 27. A conducting path 5 provides circuitry within the control unit 4, with electrical power for suitable operation.

Under normal operation, the switch 16 is in its "off" position and the telephone is connected to the central station in the usual manner. In this state the microphone is electrically disconnected from the functional elements of the control unit 4 as well as from the telephone 1. When it is desired to monitor acoustically the area in which microphone 27 is located, the switch 16 is placed in its "on" or operating position. If, now, the subscriber number associated with the telephone 1 is dialed through the central station, the ringing signals normally received by the bell within the telephone 1, are re-routed into the circuitry of control unit 4. After the elapse of a number of such ringing signals corresponding to a predetermined amount of time, the path between microphone 7 and the central station is completed, so that the caller who initiated the call can hear any audio signals impinging onto the microphone.

After a period of time established by circuitry within the control unit 4, the path between microphone 7 and the central station becomes closed, and the call is terminated. If, therefore, it is desired to continue monitoring the area in which microphone 7 is located, it is necessary to re-dial the subscriber number of telephone 1.

During the period of time in which switch 16 is in its "on" position, the telephone receiver remains on its designated hook. If desired, however, it is possible to place calls by dialing from the telephone 1 in the normal fashion even though switch 16 is in its "on" position.

Assuming, for example, that the arrangement of FIG. 1 is to be used by parents for monitoring the room in which a child is sleeping, then the switch 16 is moved to its "on" position before the parents leave the house. The microphone 27 is placed within the room of the child. When, afterwards, the parents wish to hear the sound conditions of the room within which their child is confined, they may dial from a remotely located telephone, the number corresponding to their home phone 1. After the parents have dialed the number and central station has completed the appropriate connections, the parents will hear a number of ringing signals. These ringing signals are, however, intercepted by the control unit 4 and are not transmitted to the bell of telephone 1. In this manner the child is not awakened by the ringing of the telephone. After a predetermined number of ringing signals the telephone circuit is opened, and the parents can hear any sounds within the room detected by the microphone. If under these circumstances the parents find the child awake or crying, they could speak appropriately to the child via a receiver or loudspeaker 28 which can be mounted directly within the housing retaining the microphone 27. Any conversation related to microphone 27 and loudspeaker 28, is conveyed by the path or connection 6, in the same manner as path 2 conveys conversations in conjunction with the conventional telephone 1. In the event that the child is an infant, it is feasible to mount the housing 7 directly to the crib.

Figure 2:
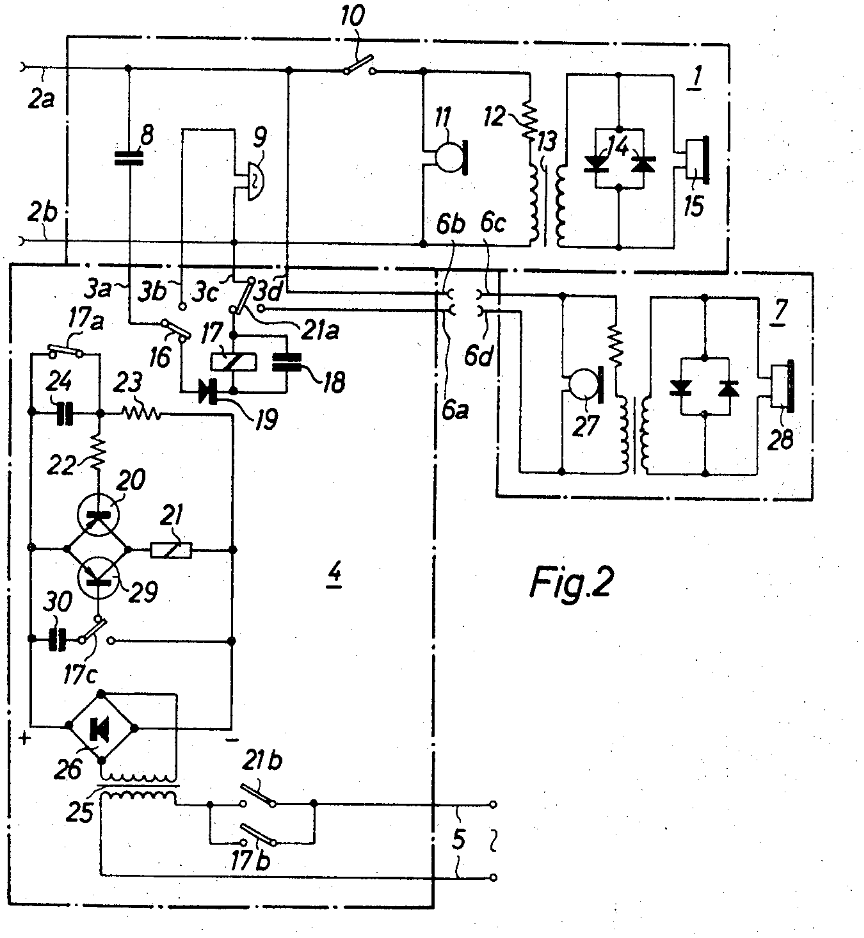
FIG. 2 is an electrical schematic diagram of the operating elements and their interconnections for adapting conventional telephones to acoustic monitoring purposes.

The details of the operating elements of this telephone arrangement as well as their interconnections, are shown in FIG. 2. The operating elements illustrated in this figure are functionally grouped so as to correspond to the telephone 1, the control unit 4, and the contents of the housing 7. The telephone 1 is connected to the central station (not shown in the drawing) by way of the connections 2*a* and 2*b*. A capacitor 8 and bell 9 located within the telephone 1 are connected to the leads 2*a* and 2*b*, respectively. The bell 9 serves to announce in the usual manner that a call has been placed to the telephone 1. The switch 10 represents symbolically that switch within the telephone, that operates when the receiver is removed or placed on its hook. When the switch 10 is closed the telephone receiving and transmitting apparatus is operatively connected across the central station lines 2*a* and 2*b*.

The telephone transmitter or microphone 11 is connected in parallel with the primary winding of a transformer 13. This primary winding includes a trimming resistor 12 present in the usual telephone. A receiver 15 is connected in parallel with the secondary winding of the transformer 13. The rectifying circuit 14 is interposed between the secondary winding and the receiver 15 to convert the alternating-current signal from the transformer into the equivalent direct-current signal suitable to the receiver 15.

When the telephone is in normal use corresponding to the "off" position of switch 16, the capacitor 8 is connected in series with the bell 9, and this series combination is connected across the central station lines, 2*a* and 2*b*. The path joining capacitor 8 to bell 9 is intercepted and a connection thereto is brought out of the telephone and into the control unit 4 by the leads designated as 3*a* and 3*b*. The switch 16 is a single pole double throw switch having its movable arm connected to the lead 3*a*. The contact of switch 16 associated with the "off" or inoperative position of the switch, is connected to the lead 3*b*. The "on" or operating contact of switch 16 is connected to a ring relay 17 by way of diode 19. The circuit through relay 17 is completed by the switching arm 21*a* and lead 3*c* connected to the central station line 2*b*.

A capacitor 18 is connected in parallel with the coil of relay 17. The relay 17 operates three switching contacts associated with it namely, 17*a* 17*b* and 17*c*. Contact 17*a* is normally closed, contact 17*b* is normally open, and contact 17*c* connects a capacitor 30 to the base of a transistor 29 when the relay is in its released state. The relay 17 operates in conjunction with a timing circuit including transistors 20 and 29, and a timing relay 21. The relay 21 operates, in turn, the two contacts 21*a* and 21*b*. One terminal of the coil of the timing relay 21 is connected to the collectors of transistors 20 and 29. The other terminal of the relay coil is connected to the negative pole of a direct-current power supply. The emitters of the transistors 20 and 29 are joined together and to the positive pole of the direct current power supply.

The base of transistor 20 is connected to a resistor 22, and the latter is connected, in turn, to the negative supply of the resistor 23. The resistor 23 serves as a charging resistor for the capacitor 24 shorted by the switching contact 17*a* when relay 17 is in its released state. Capacitor 30 normally in the discharged state and connected across the transistor 29, becomes charged when switching contact 17*c* connects the latter across the power supply with the operation of relay 17.

The direct-current power supply consists essentially of a transformer 25 and the rectifying bridge 26. Alternating current entering the control unit through the supply lines 5, is transformed to the desired voltage level by the transformer 25. The resulting alternating voltage is rectified through the bridge 26, thereby providing positive and negative direct-current supplies. Switching contacts 17*b* and 21*b* control the flow of the alternating current to the control unit.

The switching contact 21*a* operated by timing relay 21 connects, in its normal state, the central station line 2*b* to the relay 17. When the timing relay 21 becomes operated through energizing of its coil, the switching contact 21*a* connects the central station line 2*b* to the remotely-located microphone 27. A loudspeaker 28 may be employed in conjunction with the microphone 27, in a manner similar to that described for the combination of microphone 11 and receiver 15. When the timing relay 21 becomes energized, switching contact 21*a* connects the elements 27 and 28 to the central station lines 2*a* and 2*b*, via the connections 6*a*, 6*b*, 6*c* and 6*d*.

The preceding telephone arrangement operates in the following manner:

When the switch 16 is in its "off" or inoperative position and thereby connects lead 3*a* to lead 3*b*, the telephone 1 operates in the conventional manner. A ringing signal will thus be received by the bell 9, and a telephone conversation may be carried out by removing the receiver from its hook. In this "off" state of the switch 16, the circuits within the control unit 4 and the housing 7, are disconnected from the telephone.

When the switch 16 is, on the other hand, moved to its "on" position corresponding to the state wherein the area containing the microphone 27 is to be monitored, the telephone bell 9 is disconnected from the central station lines 2*a* and 2*b*. The ringing signal is routed from the bell and directed to the relay 17 by way of the diode 19. The diode serves to convert the alternating-current ringing signal to a corresponding direct-current signal suitable for operating the relay 17. During this state of operation, the switch 10 remains open corresponding to the condition that the receiver on the telephone 1 is on its hook. Outgoing calls from the telephone 1 may be placed, in the usual manner, even though the switch 16 is in its "on" position.

The ringing signal rectified by diode 19 operates relay 17, and in the absence of capacitor 18, the relay would release during the intervals between ringing signals. To prevent such pulsating operation of the relay 17, the capacitor 18 is connected in parallel with the coil of the relay. The capacitor 18 is scaled so that it acquires sufficient charge during the period that the ringing signal prevails, to maintain the relay 17 in its operated state between consecutive ringing signals.

As a result of the operation of relay 17, contact 17*b* is closed, and the alternating-current supply is transmitted, by way of the path 5, to the transformer 25 for subsequent rectification by the bridge 26. At the same time a switching contact 17*b* connects the capacitor 30 across the bridge or direct-current supply for charging purposes. The capacitor 24 is also being charged through the resistor 23, because the switching contact 17*a* is opened with the operation of the relay 17. In the normal or de-energized state of relay 17, the capacitor 24 is shorted by the switching contact 17*a*, and accordingly the base and emitter of transistor 20 are at equal potentials. In view of this condition, the timing relay 21 resides in the de-energized state.

Through proper scaling of the charging resistor 23 and capacitor 24, it is possible to select a pre-determined time after which the capacitor 24 acquires sufficient charge to operate the relay 21. Once the time relay 21 is energized, the switching contact 21*a* connects the microphone 27 to the central station lines 2*a* and 2*b*. The ringing signals are thereby terminated, and the relay 17 becomes released with the discharge of capacitor 18. As already indicated the discharge time for the capacitor corresponds to at least the interval between successive ringing signals.

Although the switching contact 17*b* opens with the release of the relay 17, the alternating supply continues to be transmitted to transformer 25, due to the condition that the switching contact 21*b* is closed. With the release of the relay 17 and the closing of contact 17*a* thereby, the capacitor 24 is shorted and becomes discharged. As a result, the transistor 20 becomes cut off.

The switching contact 17*c* disconnects the capacitor 30 from the negative supply, and re-connects it to the base of transistor 29 which becomes conductive as a result of this action. Since the collectors of the transistors 20 and 29 are joined to each other and to the timing relay 21, the latter remains energized and persists in this state until the capacitor 30 has discharged through the transistor 29.

Once the timing relay 21 is released due to the discharge of the capacitor 30, the microphone 27 is disconnected from the central station lines. At this point the situation, from the viewpoint of the calling party, is equivalent to the condition where the receiver has been replaced on the hook of telephone 1. Accordingly, if the calling party wishes to continue listening to the microphone 27 or talk over the loudspeaker 28, it is necessary to place another call by dialing again the subscriber number of telephone 1. If, on the other hand, the calling party hangs up before the timing relay 21 has released, the interconnections between central station and the microphone are not severed until the relay 21 has become released, in the normal manner, through the discharge of capacitor 30.

Figure 3:
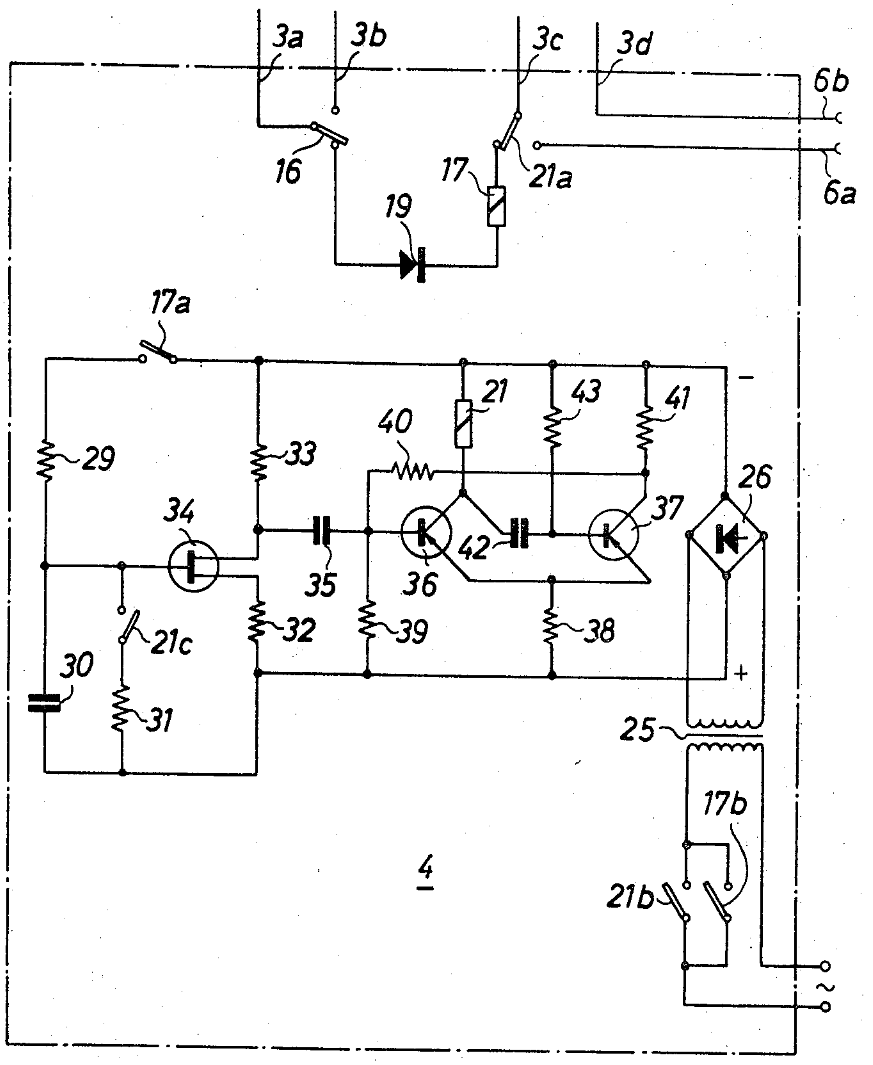
FIG. 3 is an electrical schematic diagram and shows another embodiment of the arrangement of FIG. 2.

Another embodiment of the invention is possible with the construction of FIG. 3 which shows an alternate arrangement for the control unit 4. In this embodiment, the circuitry within the control unit is made independent of the durations between ringing signals. The manually operated switch 16 functions in a manner similar to that of the embodiment of FIG. 2, and connects or disconnects the control unit from the central station lines 2*a* and 2*b*. When the control unit is connected to the telephone circuit, the alernaingt-current ringing signal transmitted through the capacitor within the telephone, is transferred to the relay 17 by way of switch 16 and diode 19. The latter converts the ringing signal to its direct-current equivalent. The circuit through the coil of relay 17 is completed via the switching contact 21*a* and the lead 3*c* connecting to the central station line 2*b*.

When the switch 16 is in its "off" position corresponding to normal operation of the telephone, the leads 3*a* and 3*b* are connected to each other similarly to that described in connection with the embodiment of FIG. 2. The essential feature of FIG. 3 resides in a trigger circuit including the capacitor 30 and charging resistor 29. When the switching contact 17*a* is closed, the series combination of resistor 29 and capacitor 30 is connected across a direct-current power supply constructed from transformer 25 and rectifying bridge 26 similarly to that described supra. A discharge circuit for capacitor 30 is generated from the resistor 30 and switching contact 21*c* connected in parallel with the capacitor. The connection joining capacitor 30 to resistor 29 is also joined to the emitter of a double-base diode 34. The two bases of this diode are connected to the positive and negative supplies, by way of resistors 32 and 33, respectively.

The base of the diode 34 connected to resistor 33, is also connected to one side of a capacitor 35. The other side of the capacitor 35 is connected to a monostable multivibrator circuit comprised essentially of transistors 36 and 37, and the capacitor 42. The monostable multivibrator circuit operates in the conventional manner whereby, in its stable state, the transistor 37 is conductive and transistor 36 is cut off. The timing relay 21 is connected to the emitter-collector circuit of transistor 36, whereas the emitters of both transistors are joined together and connected to the positive supply via the resistor 38. The base of transistor 36 is connected to the voltage divider comprised of resistors 39, 40 and 41. The resistor 41 also functions as the load resistor for the transistor 37. The capacitor 42 is interposed between the collector of transistor 36 and the base of transistor 37. The base of transistor 37 is also joined to the negative power supply by way of resistor 43.

When the switch 16 is in its "on" position and control unit 4 is, therefore, in its operating state, the ringing signal arriving to the unit via lead 3*a*, is transmitted to the relay 17 by way of switch 16 and diode 19. As already indicated, the diode 19 serves to rectify the alternating-current ringing signal so that the latter is adapted to operate the relay 17. The relay 17 is energized during the period that the ringing signal prevails, and thereby closes the contact 17*a* for the purpose of charging capacitor 30 through the resistor 29. The capacitor 30, resistor 29, and diode 34 are scaled in relation to one another so that, after the occurrence of 6 or 7 ringing signals, the capacitor 30 has acquired a charge to the extent that diode 34 transmits a peak-shaped impulse to the capacitor 35. This peak-shaped impulse is, in turn, applied to the base of transistor 36 which thereby conducts and energizes the timing relay 21.

With the operation of the relay 21, the switching contact 21*a* connects the microphone associated with lead 6*a*, to the central station via the path 3*c*. As a result the ringing signals are terminated, and the calling party may hear the sounds impinging upon the microphone. At the same time, the switching contact 21*b* is closed, so that the monostable multivibrator circuit retains its power supply even though the relay 17 is no longer energized. The operation of relay 21 also closes contact 21*c*, and this causes the capacitor 30 to discharge through the resistor 31 whereby no further pulses are transmitted through the diode 34.

Transistor 36 remains conducting and transistor 37 remains cut off, until capacitor 42 is charged, through resistor 43, to the extent that it can apply a potential to transisor 37 sufficient to return it to its conducting state. Once this state of the monostable multivibrator circuit is achieved, the relay 21 is released and the microphone is disconnected from the central station lines. The RC network of resistor 43 and capacitor 42, therefore, determines the period of time that the microphone is connected to the central station. This period of time also corresponds to the duration in which the monostable multivibrator circuit is in its unstable state. The stable state of the monostable multivibrator circuit corresponds to the condition when transistor 37 conducts, and transistor 36 is cut off.

The monostable multivibrator circuit is connected to the power supply only during the period of time that the ringing signal prevails, as a result of the action of switching contact 17*b*. This arrangement, however, does not interfere with the proper operation of the circuit, since capacitor 30 will always attain the critical potential for triggering the circuit, only when a ringing signal is present. On the other hand, it is possible to equip the relay 17 with a locking device whereby the switching contact 17*b* remains in the closed position between the ringing signals.

In view of the preceding description, it is apparent that a number of microphones can be connected in parallel to operate in conjunction with the present invention. Such an application may correspond to the condition when the sounds of a number of different areas are to be monitored. It is also apparent that abuse of the invention is not likely to occur, because it is possible to impose the condition that a number of ringing signals prevail before the microphone is connected to the central station lines. With such an arrangement the usual calling party will hang up the telephone receiver before the expiration of all of the ringing signals.

While the invention has been illustrated and described as embodied in timing and controlling arrangements it is not intended to be limited to the details shown, since various modifications and structural changes may be made without departing in any way from the spirit of the present invention.

What is claimed as new and desired to be secured by Letters Patent is:

1. A telephone arrangement comprising, in combination, a telephone instrument for receiving and transmitting telephone calls; transmission line means connected to said telephone instrument for transmitting a predetermined call signal to said telephone instrument; microphone means located remotely from said telephone instrument; switching means for connecting said microphone means to said transmission line means via said telephone instrument after a predetermined number of call signals has been transmitted to said telephone instrument through said transmission line means, said switching means disconnecting said microphone means from said transmission line means after a predetermined time interval commencing from the instant that said predetermined number of call signals has been transmitted to said telephone instrument, whereby sounds impinging upon said microphone means are transmitted from said telephone instrument and through said transmission line means during said time interval, said switching means, comprising an electronic timing circuit with a transistorized monostable multivibrator circuit establishing said time interval by the duration of the unstable state of said monostable multivibrator circuit.

2. The telephone arrangement as defined in claim 1 including bell means associated with said telephone instrument and disconnected from said transmission line means by said switching means during said first and second time intervals.

3. The telephone arrangement as defined in claim 2 including setting means for transferring the setting of said switching means between operative and inoperative states, said bell means being connected to said transmission line means when said switching means is in inoperative state and said bell beans being disconnected from said transmission line means when said switching means is in the operative state.

4. The telephone arrangement as defined in claim 1 including sound producing means in proximity of said microphone means for producing sound from signals transmitted by said transmission line means to said telephone instrument when said microphone means is connected to said transmission line means by said switching means.

References Cited

UNITED STATES PATENTS

| | | | |
|---|---|---|---|
| 2,539,139 | 1/1951 | Jordanoff et al. | |
| 2,542,535 | 2/1951 | Kaelin. | |
| 2,854,512 | 9/1958 | Zimmerman | 179—6 |
| 2,801,287 | 7/1957 | Clemency. | |
| 2,826,636 | 3/1958 | Beatty. | |
| 2,898,405 | 8/1959 | Eck. | |
| 2,909,614 | 10/1959 | Goyette | 340—261 X |
| 3,038,965 | 6/1962 | Civitano. | |

ROBERT L. GRIFFIN, Primary Examiner

J. A. BRODSKY, Assistant Examiner

U.S. Cl. X.R.

179—1, 6; 340—261